UNITED STATES PATENT OFFICE.

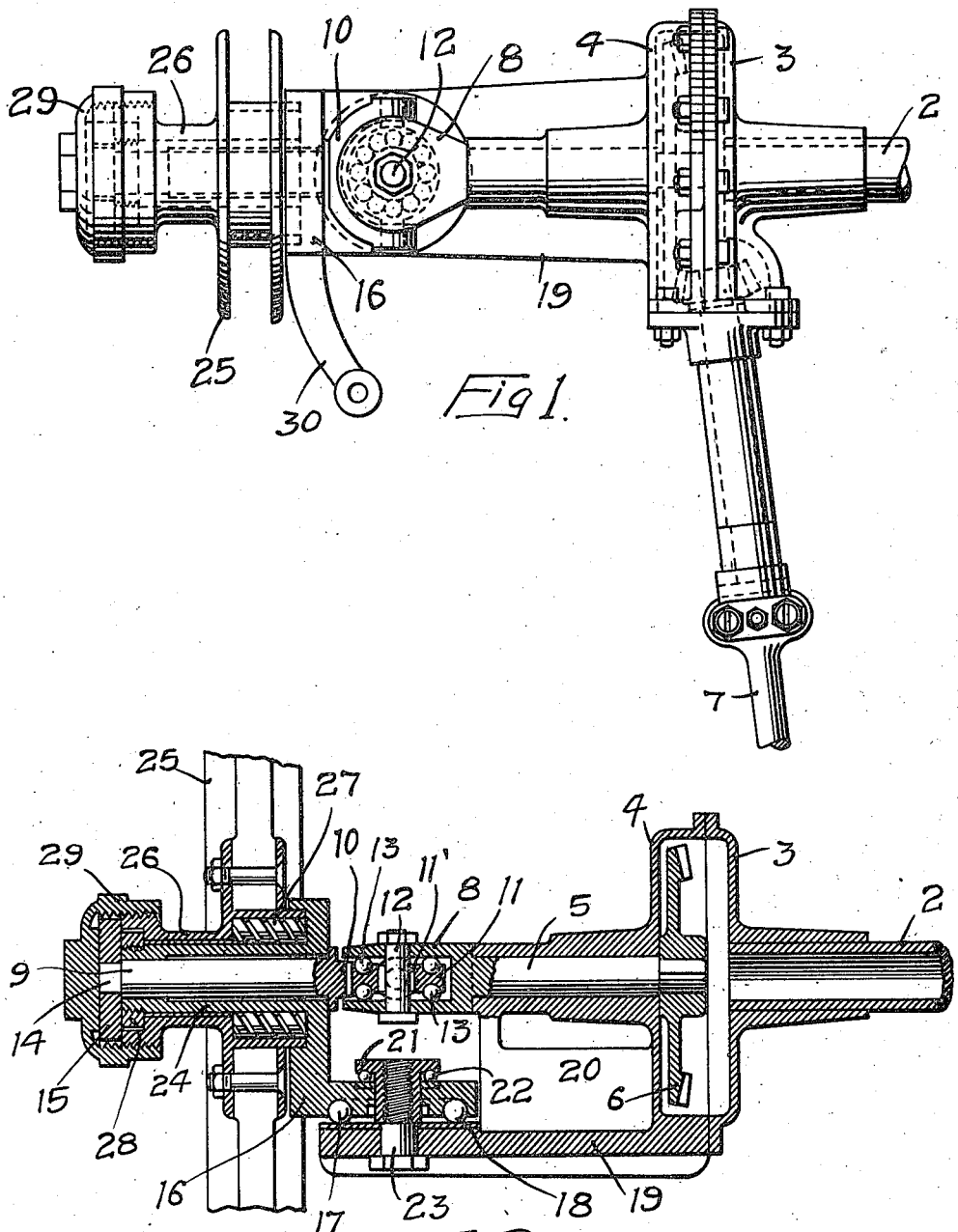

JOSEPH L. WARE, OF ST. PAUL, MINNESOTA.

TRACTION-WHEEL STEERING-DRIVE.

1,155,850.  Specification of Letters Patent.  Patented Oct. 5, 1915.

Application filed October 30, 1911. Serial No. 657,565.

*To all whom it may concern:*

Be it known that I, JOSEPH L. WARE, of St. Paul, Ramsey county, Minnesota, have invented certain new and useful Improvements in Traction-Wheel Steering-Drives, of which the following is a specification.

My invention relates to steering and driving mechanism for self propelled vehicles, and particularly to those having a front wheel drive.

The object of my invention is to provide a drive for the front or steering wheels of the vehicle, with means for supporting the load independently of the drive.

Another object is to provide a driving connection which will be free to oscillate and adapt itself to the varying conditions of the road over which the vehicle may be moving.

Other objects of the invention will appear from the following detailed description.

The invention consists generally in a floating spindle interposed between the driving connection and the wheel hub. The invention consists of various constructions and combinations, all as hereinafter described and particularly pointed out in the claims.

In the accompanying drawings forming parts of this specification, Figure 1 is a plan view showing a portion of an axle, with my invention applied thereto. Fig. 2 is a detail sectional view of the same.

In the drawing, 2 represents the axle, in this case the forward one, although the invention may be applied to the rear axle.

3 is a section of a housing mounted on the axle 2 and 4 is another section of the housing having a bearing for an axle section 5, upon which a gear 6 is mounted within the housing. This gear meshes with a pinion shown on dotted lines in Fig. 1, that is mounted on a propeller shaft 7, driven from a suitable source of power.

The axle section 5 has a fork 8 formed on its outer end and a wheel spindle 9 has a forked portion 10 that is pivotally connected to a collar 11 provided in the space between the arms of the fork 8, and said collar has a hole 11' therein to receive a bolt 12, which passes through the fork 8, said hole being of sufficient size to allow said collar to slide back and forth lengthwise within the fork, bearing balls 13 being provided above and below the collar and rolling on the inner faces of the fork arms to allow freedom of lengthwise movement of the spindle and horizontal oscillation thereof. The fork arms are of sufficient length to prevent the bearing balls from rolling out of contact therewith when the axle spindle is in its extreme outer position. The axle spindle thus has a free floating movement and its function is to supply a driving connection between the axle 5 and the wheel without, however, supporting any portion of the load. The wheel spindle has a squared outer end 14 to receive a ring or washer 15.

16 is a bracket having a ball bearing 17 on a broad flat plate 18 that is supported by a horizontal bracket 19, which projects outwardly from the housing section 4 and is preferably connected with the hub of said housing section by an integral web 20. The bearing balls 17 are of large size and the bearing may be exposed without becoming clogged or worn by dust and dirt.

A bushing 21 has a head provided with a ball bearing 22 on the top of the bracket 16 and said bushing is interiorly threaded to receive a bolt 23, which passes upward through the horizontal extension of the bracket 19. This bolt is readily accessible beneath for attaching the bracket to the axle or detaching it therefrom. The brackets 16 and 19 sustain the entire load, the bracket 16 having a hub 24 in which the wheel spindle 19 is journaled, but preferably does not contact with said hub except at its outer end, as shown in Fig. 2. The wheel 25 has a hub 26 journaled on the hub 24, preferably with anti-friction bearings 27, and a lock nut 28 has a threaded connection with the bracket hub 24 and holds the wheel hub in place thereon. The outer end of the wheel hub is exteriorly threaded, and an interiorly threaded cap 29 incloses the ring 15 and hub and forms a driving connection between the spindle 9 and the wheel hub, allowing the spindle to drive the wheel and its hub, while the bracket 16 and its hub 24 remain stationary.

The bracket 16 is provided with a rearwardly extending arm 30, to which the steering device may be attached in the usual way, and by means of this steering device, (not shown, as it is of common construction) the spindle 9 may be oscillated to swing the wheel and guide the machine, and at the same time the bracket 16 will be oscillated on its pivot, which is concentric with the bolt 12. The bracket 16, however, sustains the load, and is free to oscillate in a horizontal plane with the oscillation of the wheel hub, while the spindle 9 serves as a steering and driving means entirely, and this spindle being free to move lengthwise it is evident that the driving connection will not bind but will accommodate itself easily and quickly to the varying positions of the wheel.

It will thus be immaterial at which angle the wheel may stand with respect to the forward axle, the drive will be effected with equal freedom and absence of undue friction, and at the same time the steering of the wheel can be easily and quickly accomplished through the oscillation of the floating spindle.

I claim as my invention:—

1. The combination, with an axle section having a forked outer end, the arms of said fork having inner flat bearing surfaces, of a collar fitting between the arms of said fork and having anti-friction bearings thereon, said collar having a limited lateral movement between said arms, and a wheel spindle having a forked inner end pivotally connected with said collar, the lateral movement of said collar permitting longitudinal movement of said spindle.

2. The combination, with an axle, of a bracket carried thereby and having a horizontal bearing surface, a spindle having a driving connection with said axle, a second bracket having a hub to receive said spindle and pivoted on said horizontal bracket and having an anti-friction bearing thereon, said pivot comprising a bushing having a ball bearing on said second bracket, and a bolt passing through said first named bracket and tapped into said bushing.

3. The combination, with an axle, of a housing mounted thereon and provided with a bearing projecting outwardly, concentric with said axle, and a bracket parallel substantially with said bearing and having a flat bearing surface, an axle section mounted in said bearing and having a forked outer end, a collar having a ball bearing within said fork, a wheel spindle having a fork to embrace said collar, a pivot connecting the arms of said wheel spindle fork with said collar, a second pivot passing through the arms of said axle section fork and through said collar and allowing rotation of said collar and a lateral horizontal movement in said fork, a bracket having an anti-friction bearing on said housing bracket, and a pivot concentric with the said second pivot of said axle section and provided with a hub in which said wheel spindle is journaled, said brackets supporting the load while the driving power is transmitted through said axle section and spindle.

In witness whereof, I have hereunto set my hand this 10th day of October, 1911.

JOSEPH L. WARE.

Witnesses:
GENEVIEVE E. SORENSEN,
EDWARD A. PAUL.